United States Patent [19]

Addeo et al.

[11] Patent Number: 5,342,463
[45] Date of Patent: Aug. 30, 1994

[54] PROCESS FOR PRODUCING SHAPED ARTICLES BY STARTING FROM REINFORCED THERMOPLASTIC SHEETS

[75] Inventors: Antonio Addeo, Novara; Mario Vitali; Roberto Bonari, both of Milan, all of Italy

[73] Assignee: Centro Sviluppo Settori Impiego S.r.l., Milan, Italy

[21] Appl. No.: 967,284

[22] Filed: Oct. 27, 1992

[30] Foreign Application Priority Data

Oct. 28, 1991 [IT] Italy ................. MI91 A 002854

[51] Int. Cl.⁵ ............................................. B32B 31/04
[52] U.S. Cl. ................................... 156/156; 156/242; 156/245; 156/285; 156/292; 264/314; 264/316; 264/516; 264/520; 264/523; 264/545
[58] Field of Search ............. 156/156, 147, 242, 245, 156/285, 292; 264/512, 546, 314, 316, 516, 520, 523, 530, 545

[56] References Cited

U.S. PATENT DOCUMENTS

| 3,281,301 | 10/1966 | Bolesky | 264/512 |
| 3,962,392 | 6/1976 | Conner | 264/316 |
| 4,261,775 | 4/1981 | Tschudin . | |
| 4,576,776 | 3/1986 | Anderson | 264/546 |
| 4,637,909 | 1/1987 | Lucca | 156/156 |
| 4,858,362 | 2/1989 | Freeman | 264/314 |
| 5,037,599 | 8/1991 | Olson | 264/316 |
| 5,114,767 | 5/1992 | Berns et al. | 264/545 |

FOREIGN PATENT DOCUMENTS

| 2414992 | 8/1979 | France . |
| 2627127 | 8/1989 | France . |
| 903986 | 8/1962 | United Kingdom . |
| 2088281A | 12/1980 | United Kingdom . |
| 2216062A | 4/1989 | United Kingdom . |

OTHER PUBLICATIONS

European Search Report, Jan. 20, 1993.

Primary Examiner—Caleb Weston
Attorney, Agent, or Firm—Bryan Cave

[57] ABSTRACT

A process for fabricating manufactured articles from fiberglass reinforced thermoplastic sheets, which consists of forming said plates while they are heated at their melting point and coupled with a barrier film, by either blow-moulding or thermoforming.

4 Claims, 1 Drawing Sheet

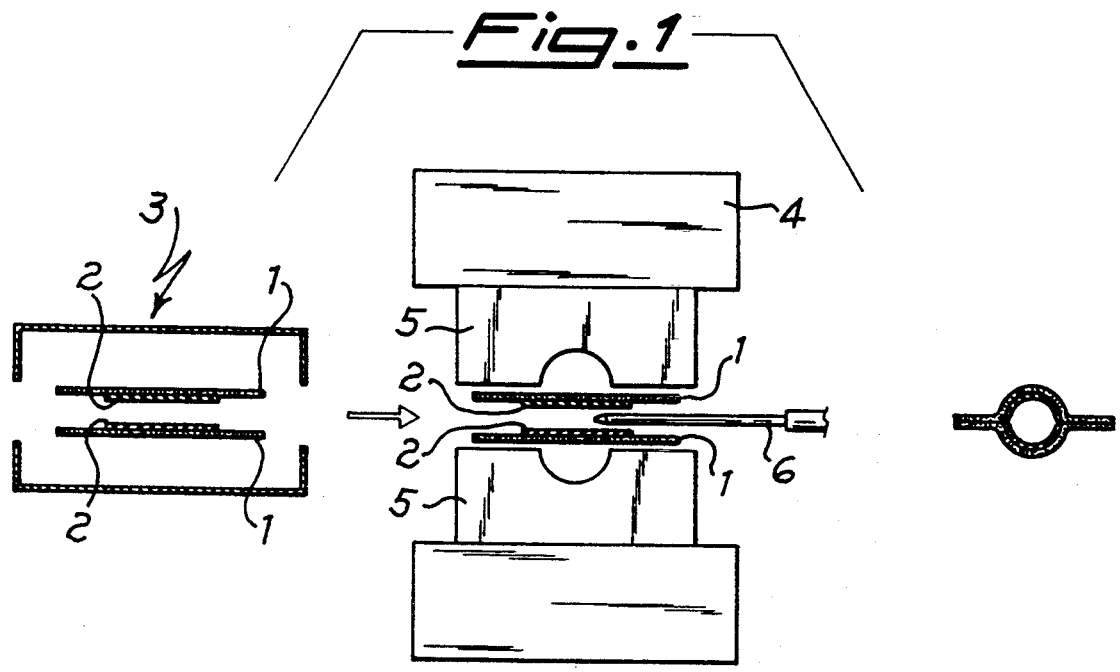
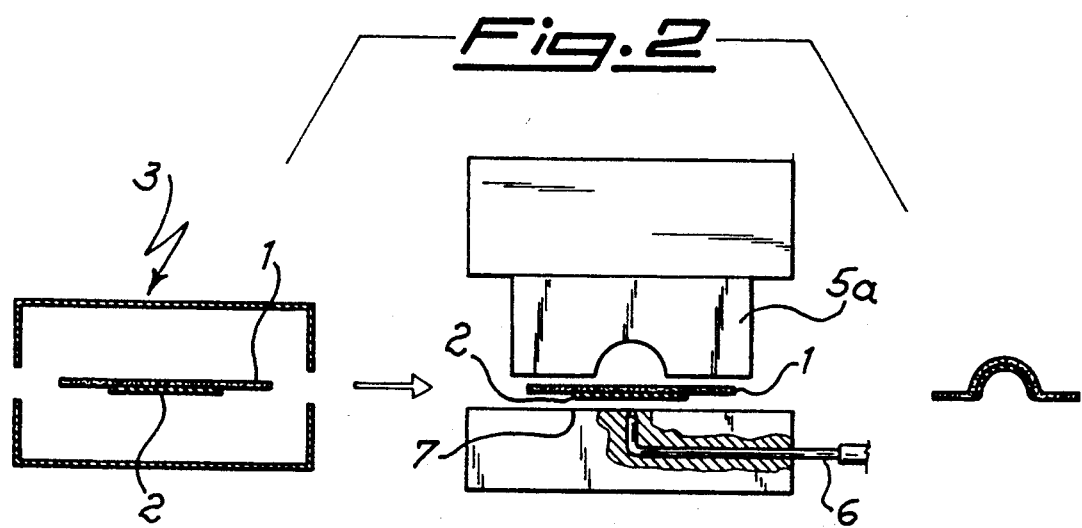

PROCESS FOR PRODUCING SHAPED ARTICLES BY STARTING FROM REINFORCED THERMOPLASTIC SHEETS

The present invention relates to a process for transforming reinforced thermoplastic sheets into manufactured articles, by heating and subsequent moulding.

The technology of flow-moulding in order to transform fiberglass-reinforced sheets of thermoplastic material [polypropylene, poly-(ethylene terephthalate), polyamide, and so forth] is known; such sheets are known as "glass mat thermoplastic" (GMT) sheet or "reinforced thermoplastic sheet" (RTS). The sheets, suitably cut to the desired size ("blanks") are heated by means of different types of heating procedure and means (irradiation, convection, contact, microwaves, and so forth), until they reach the softening point of the polymer which constitutes the matrix thereof. The blanks are then charged to the hollow of the mould and, with the aid of a press, they are forced to flow and conform to said mould hollow. For that technology, high clamping pressures are required (of the order of 200 bars).

The technology of blow-moulding for manufacturing box-shaped structure by starting from thermoplastic polymers, is known as well. The necessary equipment is constituted by an extruder, an extrusion head with circular cross-section, and a blowing unit (mould bearing press, with inlet system for compressed air). The thermoplastic polymer, fed to the extruder, leaves from the head with circular cross-section in tube form (parison) and is fed to the true blowing step, in which the parison is closed between two half-moulds and is conformed to the interior hollow of the mould, by means of compressed air.

Also well-known is the thermoforming technology, which makes it possible shaped manufactured articles to be produced by starting from sheets (or films) of dense thermoplastic polymer, heated and shaped inside a mould, by being forced to deform by means of compressed air, or vacuum application.

Blow-moulding technique, as it was first ideated and implemented in the existing facilities, is only used in order to transform polymers fed as a loose raw material, and not in order to transform semifinished articles (such as, e.g., sheets).

On the contrary, the thermoforming technology is used with polymeric sheets, but these—in order to be transformed into shaped articles by the action of compressed gas, or of vacuum, should be of dense (i.e., gas- or vacuum-tight) type. In the case of RTS sheets, which become porous in the molten state, the operation of fabrication by blow-moulding or vacuum-thermoforming only causes the molten mass to undergo some swelling, in that a sufficient barrier effect to pressure or vacuum does not exist.

The present Applicant found now that a process can be accomplished, which applies the technologies of blow-moulding and vacuum-thermoforming also to fiberglass reinforced thermoplastic sheets (RTS) in order to transform said sheets into hollow, or variously shaped, manufactured articles.

The process according to the present invention consists of a method for transformation of fiberglass-reinforced thermoplastic (RTS) sheets, characterized in that said method comprises the steps of endowing at least one sheet with gas tightness characteristics, positioning said gas-tight, heated, sheet on a half-mould provided with at least one hollow, and giving said gas-tight sheet the desired end form inside said mould hollow, by means of a pressure differential between the two faces of said sheet.

The process according to the present invention uses properly selected barrier films, suitable for securing air-or vacuum-tightness during the manufactured article forming step (whether carried out under pressure or vacuum), and furthermore makes it possible to use pressure values which are considerably lower than are necessary for the technology of blow moulding, i.e., of the order of bars (typical values are within the range of from 6 to 12 bars), instead of hundreds of bars. Such a process provides a considerable simplification of the processes known in the art, with consequent reduction in costs of machinery, of tools (moulds) used, and in operating costs of production cycles.

The present invention is disclosed now by referring to the accompanying drawings, supplied for merely exemplifying, non-limitative purposes, in which:

FIG. 1 shows a schematic view which illustrates a first form of practical embodiment of the process for fabricating double-shell, box-shaped manufactured articles;

FIG. 2 shows an analogous schematic view to FIG. 1, and illustrates a second form of practical embodiment of the process in order to fabricate single-shell, shaped manufactured articles.

The process according to the present invention essentially requires the use of barrier films 2, to be applied to RTS sheets 1, the barrier films performing the following functions:

securing tightness to air or vacuum during the blowing or intake step;
 preventing any mutual bonding and/or welding of the sheets in the molten state from occurring in those zones of said sheets in which said events are undesired.

In order to practice the process, a heating oven 3; a conveyor system (not shown) to move the sheets from said oven to the mould; a low-operating-pressure press 4; and a suitably arranged blowing/intake nozzle 6 are used.

For exemplifying, non-limiting purposes, the following forms of practical embodiment are disclosed in the following:

A) Case of blow-moulding

Referring to FIG. 1, one pair of reinforced thermoplastic sheets 1 are arranged inside a heating oven 3, mutually facing, with two films 2 being interposed between them, which display a high enough gas tightness, and have a size which is larger than the outline of mould hollow, and smaller than the outline of the sheets to be moulded. According to an alternative route, the films can be positioned on said sheets after the heating step.

In any case, the heating of the sheets is carried out until the softening point of the polymer which constitutes the matrix of the sheets, or a higher temperature, is reached, so that the sheets are easily conformable but retain high enough strength in order to be drawn.

At the end of the heating step, the sheets are collected by a conveyor system (not shown) and are charged between two half-moulds 5 inside the press 4, so that said barrier films 2 are facing to each other. Between said films a nozzle 6 for compressed air injection is arranged. The press is clamped, compressed air is fed and vacuum is possibly applied, through the mould 5.

The sheets are forced to conform to the hollow of the mould, and at the edges, not protected by the films 2, the welding takes place.

B) Case of moulding by thermoforming under air pressure, and optional vacuum application Referring to FIG. 2, according to a second form of practical embodiment of the process of the invention, one single reinforced thermoplastic sheet 1, to which a barrier film 2 is juxtaposed, is charged to the heating oven. The resulting set up (i.e., the assembly consisting of the sheet 1 and of the barrier film 2) is subsequently positioned between a half-mould 5a and a counter-plate 7 with the barrier film being interposed between the latter and the sheet to be moulded. Through the centre of the counter-plate 7, a nozzle 6 injects air between the counter-plate 7 and the barrier film 2, forcing the sheet 1 to undergo the required deformation, and conform against the half-mould 5a, through which vacuum can optionally be applied.

For some of polymers used (as an example, polypropylene may be mentioned), the novel technology can be used in a continuous process which starts, rather than from pre-fabricated RTS sheet, directly from polymer granule or powder and from fiberglass, according to a suitable formulation, then integrating, in one single on-line, continuous process, the production of the sheets and the fabrication of the manufactured articles.

As said hereinabove, the barrier films perform the basic function of preventing air losses during the blowing or intake step and also of preventing the molten sheets from undergoing bonding and/or welding in those zones in which such events are undesired. Said barrier films can be of different nature: synthetic or natural polymeric films, metal films, coatings, and so forth. In particular, 50–200 microns thick poly-(ethylene terephthalate) films, sheets of rubber latex and the silicone rubbers with sheet thicknesses within the range of from 200 to 500 microns are useful.

Said films must have a size which is larger than the outline of the mould, in order to be tightly sealed on mould clamping; and smaller than blanks outline, in order not to interfere with the welding of RTS sheets, also caused by press clamping.

When one single blank is moulded, the barrier film can surely be re-used. On the contrary, when box-shaped, double-shell structure are manufactured, a zone in the mould must be provided in which the air injection nozzle must be installed, the free opening of which should be such as to enable the barrier films to be recovered—which, otherways, would be lost.

The advantages offered by the process according to the present invention can be better specified as follows:

Decrease in equipment costs

The classic equipment for blow moulding is considerably reduced: neither the extruder, nor the circular-cross-section extrusion head are used any longer. Furthermore, a high-pressure press is not required, which, on the contrary is necessary for flow-moulding. This is so, because according to the present novel technology, the press is only required to counteract low blowing pressures (typical values comprised within the range of from 6 to 12 bars, or even lower) and, for double-shell, box-shaped structures, must be capable of securing the welding of the peripheral edges of the shaped body to take place.

Decrease in mould costs

Thanks to the low pressure values used, the moulds can be made, instead of steel, also from aluminum, plastics or wood. Furthermore, heating the mould is no longer necessary: the cold-moulding technique is used.

Short production cycles

The production cycles are the same as provided for flow-moulding: from 30 to 60 seconds.

Possibility of different typologies of shapes

Are as already mentioned hereinabove: double-shell, box-like shapes; asymmetrical-drawing, double-shell, box-like shapes; single-shell contoured shapes; keeping in mind that in those zone in which maximal stretch is expected, a supplementary blank can be charged in order to make possible a higher wall thickness to be obtained in the end manufactured article.

Different thicknesses or different compositions of the two used layers

Sheets with different sheet thicknesses can be used (such as, e.g.: a double thickness for prefabricated sheet and a reduced thickness for non-drawn, flat portion).

Furthermore, there can be used, e.g., a sheet with continuous filament reinforcement for low drawing percentages (and high mechanical properties), and a chopped-filament reinforced sheet for higher drawing rates, or a sheet with a cloth-type reinforcer agent (which will not be drawn), together with a chopped-filament reinforced sheet.

Obviously, double-shell, box-shaped structures with different percentage contents of fibreglass in the two constituting layers, are possible.

Also sheets of different polymeric materials can be used, with the proviso that mutual compatibility should exist in the welding area.

Possibility of applying external coating films (between the mould and the blanket)

By pre-arranging a coating film inside the interior of the mould, finished articles can be obtained with a desired aesthetical or functional finish (e.g., a scratch-resistant, soil-resistant, antistatic finish).

Furthermore, coating films can be used, which are heated together with the blank and undergo the drawing during the moulding step, with finished articles being thereby obtained with desired end characteristics (e.g.; a soft outer feel, by coating with soft polypropylene films).

If the mould is embossed, pieces with soft feel, embossed surface finish and variable fiberglass content can be obtained as well.

We claim:

1. A process for transforming reinforced thermoplastic sheets (RTS), which become porous in the molten state, into a double-shell box-shaped manufactured article by heating and subsequently molding the sheets, said process comprising the following steps:
    a. overlaying the sheets with a pair of barrier films to render the sheets gas-tight;
    b. charging the sheets between two half molds with the sheets facing each other and having the barrier films therebetween;
    c. clamping together both half-molds; and
    d. forcing the sheets to conform against said half-molds by using either compressed air which is fed between said two barrier films or vacuum which is applied to the half-molds, allowing the sheets to bond or weld to each other, whereby to obtain the double-shell box-shaped manufactured article.

2. The method of claim 1, wherein the pressure used to shape said sheets is within the range of from 0.5 to 20 bars.

3. The method of claim 1, wherein the barrier films are larger than the outline of the mold and smaller than the blanks outline, whereby the barrier film is tightly sealed on mold clamping.

4. The method of claim 1, wherein the pressure used to shape said sheets is within the range of from 6 to 12 bars.

* * * * *